CONTROL SYSTEM FOR ELECTROLYTIC MACHINING APPARATUS

Original Filed July 28, 1964 3 Sheets-Sheet 1

Inventor:
Merlin O. Petroff
By
Gradolph, Love & Rogers
Attys

CONTROL SYSTEM FOR ELECTROLYTIC MACHINING APPARATUS
Original Filed July 28, 1964 3 Sheets-Sheet 2
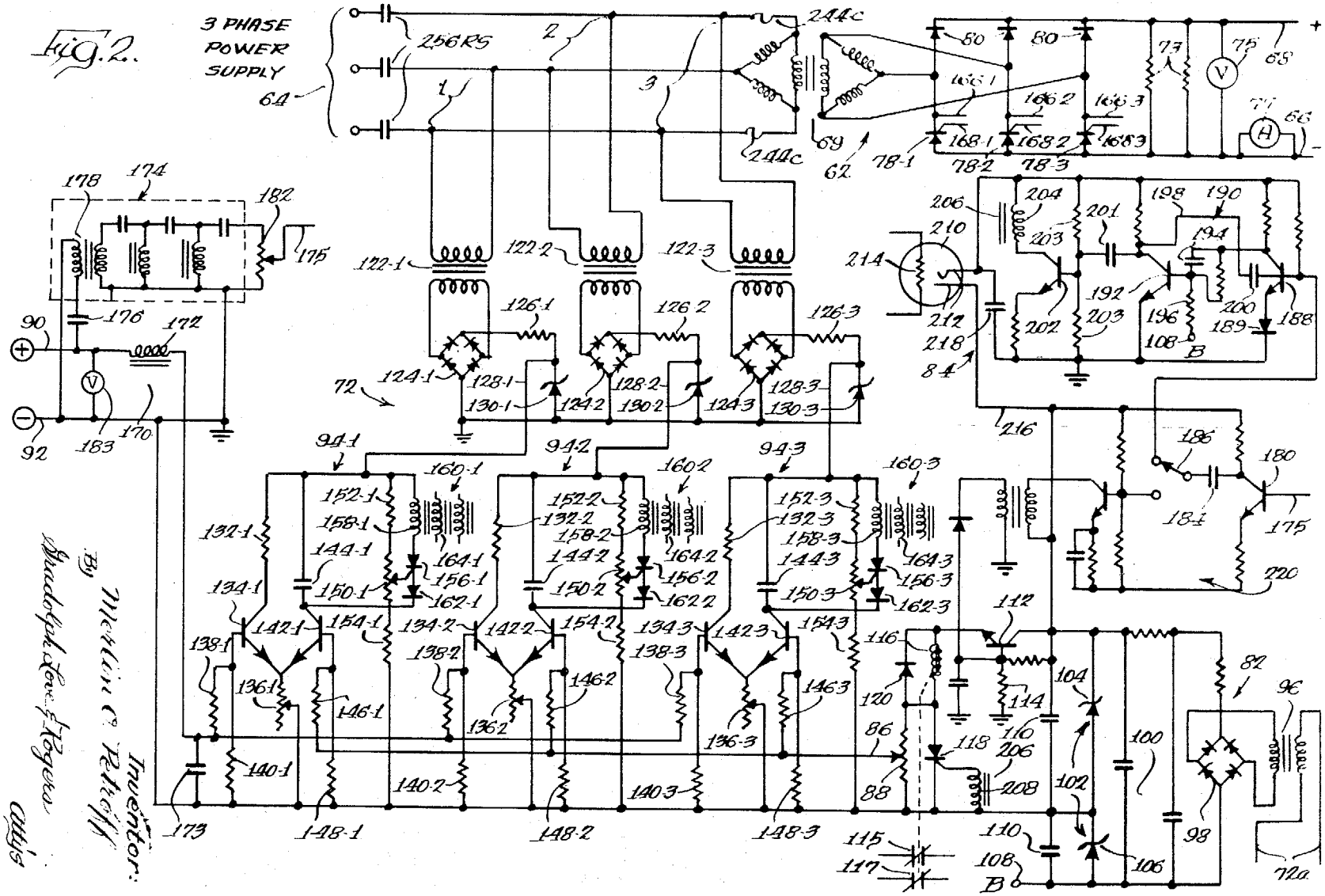
Inventor:
Merlin O. Petroff
By
Gradolph Love & Rogers
Attys March 21, 1972 M. O. PETROFF Re. 27,312

CONTROL SYSTEM FOR ELECTROLYTIC MACHINING APPARATUS

Original Filed July 28, 1964 3 Sheets-Sheet 3

Inventor
Merlin O. Petroff
By Rudolph Love & Rogers
Attys

United States Patent Office

Re. 27,312
Reissued Mar. 21, 1972

27,312

CONTROL SYSTEM FOR ELECTROLYTIC MACHINING APPARATUS

Merlin O. Petroff, Grayslake, Ill., assignor to Anocut Engineering Company, Elk Grove Village, Ill.

Original No. 3,433,728, dated Mar. 18, 1969, Ser. No. 385,746, July 28, 1964. Application for reissue Sept. 4, 1969, Ser. No. 871,489
Int. Cl. B23p *1/04;* B01k *1/00*
U.S. Cl. 204—224 12 Claims

Matter enclosed in heavy brackets [ ] appears in the original patent but forms no part of this reissue specification; matter printed in italics indicates the additions made by reissue.

ABSTRACT OF THE DISCLOSURE

An electrolytic machining apparatus of the type having an electrode placed opposite an electrode with a power unit to advance the electrode and workpiece toward each other while electrolyte is pumped through the gap between the electrode and the workpiece, an electric circuit for the power unit and the electrolyte pump, a transformer, a current rectifying output stage for electrolyzing current including at least one silicon controlled rectifier connected between the transformer and the electrode and workpiece, a voltage control unit coupled to the rectifier to maintain the electrolyzing current voltage at a predetermined value, and a control unit connected to detect an instantaneous charge in the electrolyzing current voltage to interrupt the firing of the silicon controlled rectifier and to cause the electric circuit to deenergize the power unit and the electrolyte pump.

Figure 1:
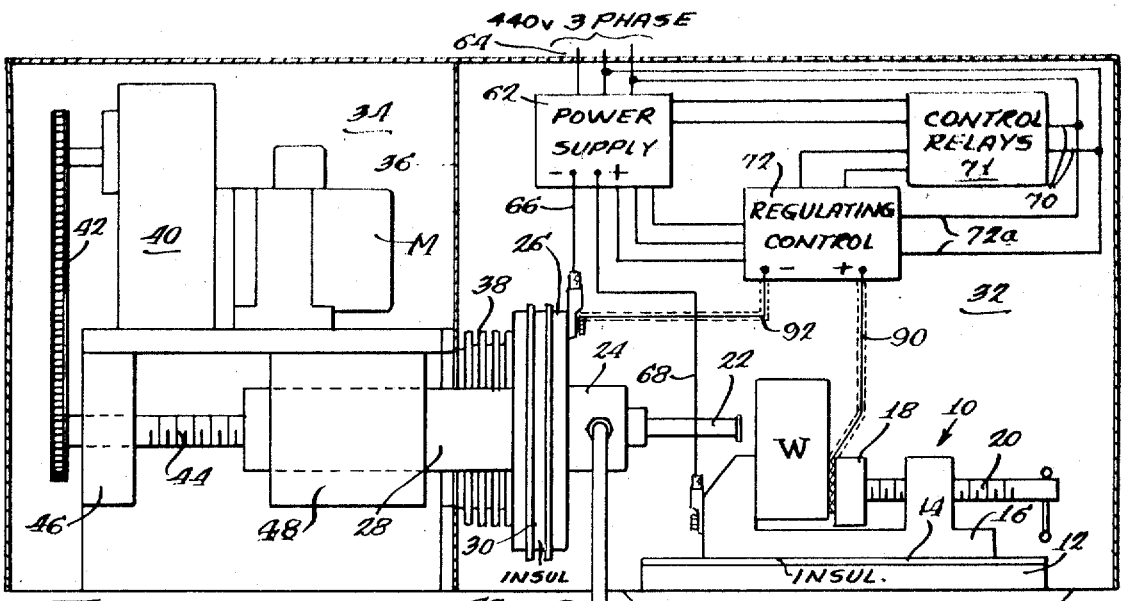

The present invention relates to a new and improved control system for detecting and responding to sudden and unwanted changes in a generally stable direct current condition existing between a pair of relatively movable conductive members. More particularly, this invention is concerned with a new and improved control system for regulating the current in an electrolytic machining apparatus of the type shown and described in Lynn A. Williams Patent No. 3,058,895, dated Oct. 16, 1962, and for responding to malfunctioning of the apparatus and the current supply to prevent damage to the machining, apparatus, the electrode used therein, and the workpiece being electrolytically machined.

In the aforementioned patent, and others, and applications for patent owned by Anocut Engineering Company, the assignee of the present invention, there are disclosed novel electrolytic machining apparatuses and methods for producing cavities of regular and irregular shapes in electrically conductive and electrochemically erodible workpieces. In such apparatus, the workpiece and an electrode having an electrically conductive working face, are mounted in the machine so that they may be advanced and retracted relatively toward and away from each other, usually at a constant speed, and usually by driving the electrode toward the workpiece by a powered feed screw. The rate of feed preferably is adjustable.

The electrode may take various forms, as shown in the forementioned patent, and in Lynn A. Williams Patents Nos. 3,019,178, issued Jan. 30, 1962, and 3,041,265, issued June 28, 1962, and as known by those skilled in the art.

The electrolyte is pumped from a supply tank to the work gap either through the electrode or through other channels and passageways under superatmospheric pressure so that the static pressure on the electrolyte at the entrance to the work gap is at least 25 p.s.i. and preferably higher. Usually the electrolyte is permitted to escape to the atmosphere at the exit from the work gap, but under some conditions a back pressure may be established by restricting the escape passageway as shown, for example, in FIG. 24 of the aforementioned Patent No. 3,058,895.

The electrolyzing direct current is supplied from a power supply which is connected to a conventional 440 volt three-phase 60-cycle commercial supply, the current being supplied through a step-down transformer and rectifier system so that the current supplied across the work gap usually lies in the range of 4 to 18 volts, which provides a high current density for the electrolyzing current.

The electrolyte may take various forms, but may be a soluble, readily ionized metallic salt, of the type disclosed in the aforementioned Patent No. 3,058,895, but it has been found that fairly concentrated solutions of sodium chloride, potassium chloride, or combinations of sodium chloride and potassium chloride, sometimes with additions of sodium and potassium nitrate, serve as admirable and inexpensive electrolytes.

In the operation of the above described equipment, the working face of the electrode is brought within close proximity to the face of the workpiece to be machined; for example, within about .015″. The electrolyte pump is started, and after the electrolyte flow has been established, the circuits controlling the electrode feed motor and the electrolyzing current power supply are closed to activate the electrolytic machining apparatus. If the apparatus operates as intended, it may be automatically or manually shut off at the end of the machining operation, the electrode retracted, and the machined workpiece removed to be replaced by another workpiece to be machined.

Apparatus of the type above described and disclosed in the aforementioned Patent No. 3,058,895, operates in a preferred manner only when the spacing between the electrode working face of the workpiece and the face of the workpiece undergoing machining is very close as, for example, within the range of .0005″ to .030″ as long as the electrolyte is supplied to this close work gap at a substantial pressure within the range above described, and the workpiece material is removed at a rate at least equal to the rate of advance of the electrode. This may be accomplished by insuring that the electrolyte is fed within the desired pressure range, the electrolyzing current is supplied within the proper range, and an appropriate electrode feed rate is selected. By use of apparatus of this type it has been possible electrochemically to erode material from an appropriate workpiece at the rate of .800″ per minute add maintain machining tolerances of within a range of .001″ or better, while keeping the power used to achieve this result to a workable minimum.

It is preferred that such apparatus be operated within the parameters above described, that is, close spacing distance, high pressure on the electrolyte at the entrance to the work gap, and low voltage and high density of the electrolyzing current. It is also desirable that this system operate with no arcing or sparking between the working face of the electrode and the work face of the material being machined. Sparking may lead to arcing, and arcing results in serious damage to the electrode working face and the workpiece.

Systems have been proposed to detect the presence of sparks and to actuate control relays or the like to shut down the electrical supply. However, the time response of such systems as are known is slow enough to permit significant damage to the electrode or the workpiece, or both, before shut down occurs.

It is, therefore, one of the objects of the present invention to maintain a steady state for electrolyzing current flowing between the workpiece and the electrode, and also ) detect a spark passing between the workpiece and the lectrode and to respond to that instantaneously to shut ff the electrolyzing current and the infeed of the elec-:ode driving motor before a second spark can occur.

Another object is to provide a rectification system in ıe output of a three-phase step-down transformer, 'herein silicon controlled rectifiers and diodes are used ɔr rectification with the silicon controlled rectifiers being onditioned for firing on each cycle of its respective phase, nd the failure to trigger one of them upon detection of spark across the work gap will result in failure to trigger ll of the silicon controlled rectifiers so as to shut off the lectrolyzing current.

Another object is to provide an electrolyzing current ıpply having a silicon controlled rectifier responsive in ach phase of a multiphase step-down transformed cur-ent, which rectifier is triggered from a control circuit 'ith the latter responsive to a single spark across the 'ork gap to terminate the firing signal to the silicon con-rolled rectifiers.

Another object is to provide a control system for sup-lying electrolyzing current to the interface between a 'orkpiece and an electrode, which is responsive within time of six milliseconds to existence of a spark between ıe workpiece and the electrode to shut off the electrolyz-ıg current and stop the relative infeed of workpiece nd electrode.

Another object is to provide an improved control sys-ɜm for regulating the voltage of the electrolyzing cur-ent and for responding to abnormalities in such current 'hich is free from drift in its component parts and re-ponds substantially instantaneously to maintain the volt-ge and to a single spark in the interface between the 'orkpiece and the electrode to shut off the supply current nd the relative infeed of the workpiece and the elec-rode.

Figure 4:
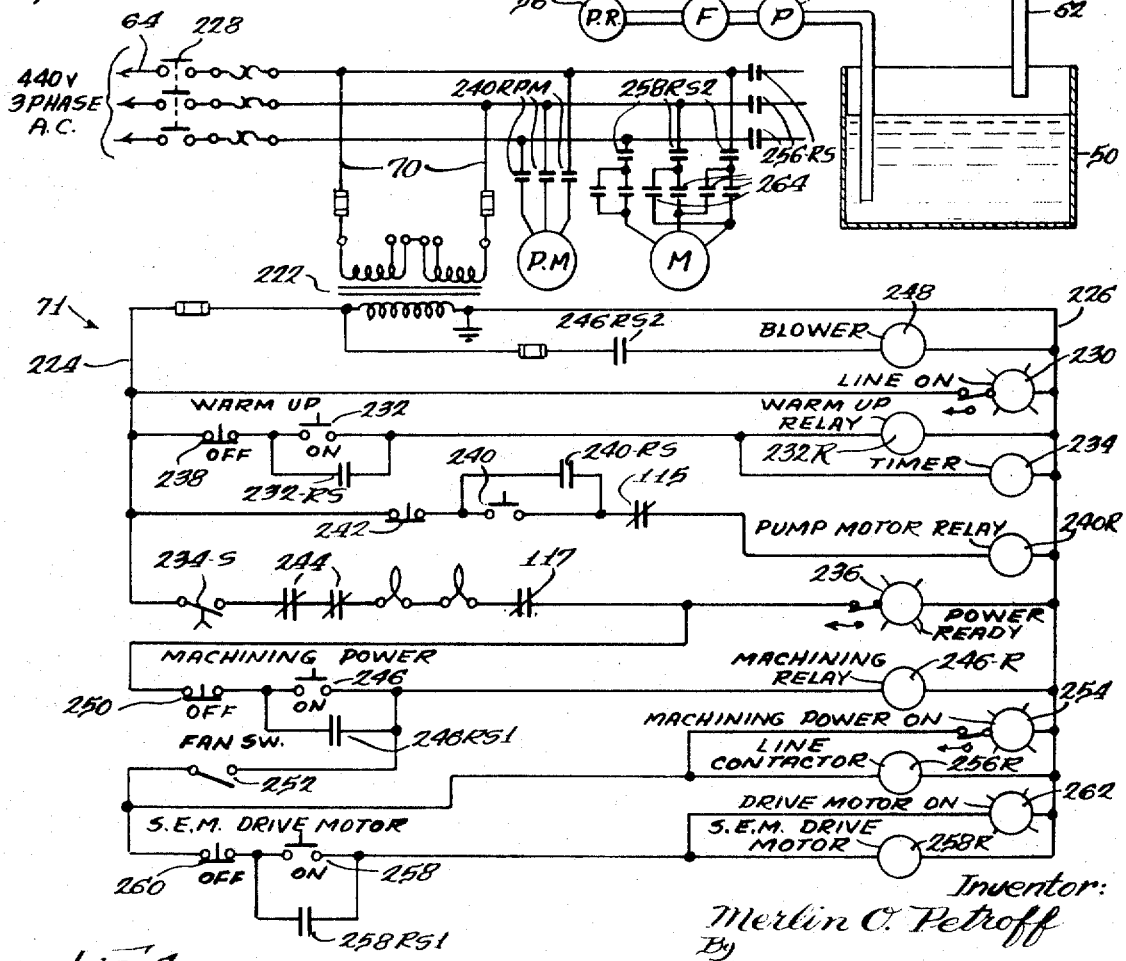
Figure 3:
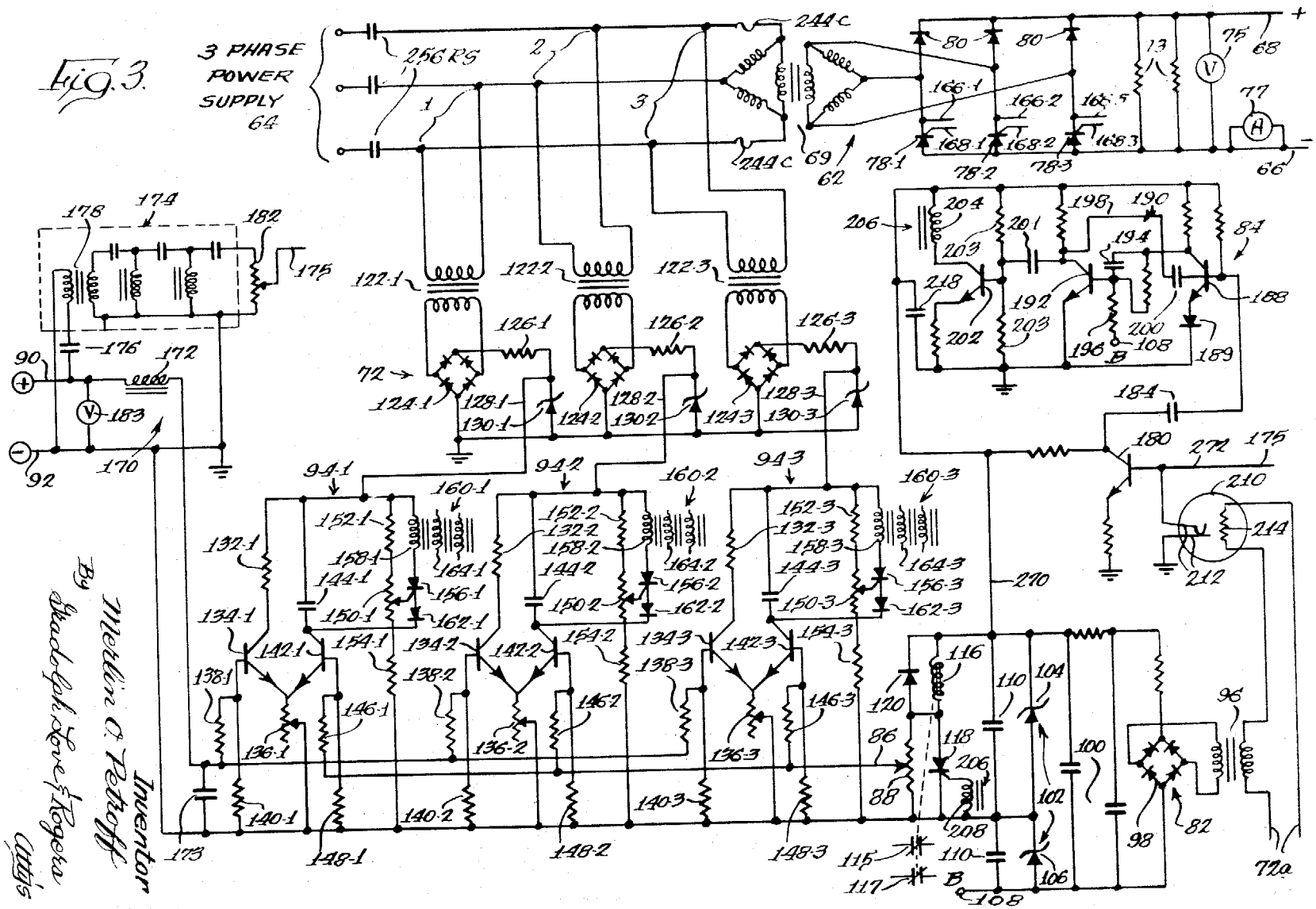

Other objects and advantages will become apparent rom the following description taken in conjunction with ıe accompanying drawings, wherein FIG. 1 illustrates schematically an electrolytic ma-hining apparatus provided with means for feeding an lectrode toward a workpiece, and indicating the power ıpply of electrolyzing current, the controls for the power ıpply, and the regulating control which forms the prin-ipal part of the present invention;

FIG. 2 is a schematic illustration of a regulating con-ol forming the present invention, which is indicated by ne of the boxes in FIG. 1;

FIG. 3 is a schematic illustration similar to FIG. 2, howing a modification of the regulating control and n improved form thereof particularly for use in elec-olytic machining or cavity sinking; and FIG. 4 is a wiring diagram of the relays, relay switches, nd other controls necessary for conditioning the circuit ɔr operation and for the motor controlling the elec-olyte pump and the reversible motor controlling the ıfeed of the electrode to the workpiece.

In FIG. 1 there is schematically illustrated an electro-'tic machining apparatus of the type disclosed in the pre-iously mentioned Lynn A. Williams Patent No. 3,058,-95, dated Oct. 16, 1962, and in the Leonard Malkowski atent No. 3,130,140, dated Apr. 24, 1964, and in the co-ending application of Lynn A. Williams and Leonard 'alkowski, Ser. No. 201,679, filed June 11, 1962, for an lectrolytic Shaping and Cavity Sinking Apparatus.

As shown in FIG. 1, a workpiece W is held in a vise r similar workpiece holder 10 mounted on a table 12 nd insulated therefrom by a sheet of electrical insulation 4 with the workpiece table capable of being moved ver-cally in order to adjust the workpiece with respect to ıe electrode which will be described. As illustrated, the 'ork holder 10 is of the vise type and includes a base 16 ecured to the table 12, a movable clamp 18, and a screw 0 for moving the clamp into engagement with the work-iece W.

An electrode 22 of the hollow tubular type, as shown in several of the figures in the aforementioned Williams Patent No. 3,058,895, is mounted on a manifold 24 carried on a plate 26 at the forward end of a ram 28. An insulating block 30 is interposed between the forward portion of the ram 28 and the manifold mounting plate 26 in order electrically to insulate the electrode 22 and its associated elements from the mechanism for driving the electrode 22 toward and into the workpiece.

The electrode 22, workpiece W, and the work holder 10, are mounted in a work area or compartment 32 and the mechanism for advancing the electrode toward and into the workpiece is mounted in a machining compartment 34 which is separated from the work compartment by a wall 36 through which the ram 28 extends and projects, and is sealed thereagainst by a bellows 38 as more fully explained in the previously mentioned Leonard Malkowski Patent No. 3,130,140. The ram 28 and electrode 22 are movable in a direction perpendicular to the plane of the drawing to provide for full positioning adjustment between the electrode and the workpiece.

The ram 28 is advanced and retracted by a reversible motor M through a variable gear readuction 40 and a gear and chain drive 42 to a screw 44 journaled in a bearing 46, and other bearings, not shown, connected to the ram which is movable through a guide 48 so as to be movable rectilinearily by the motor M but not otherwise.

Electrolyte is supplied to the manifold 24 and the electrode 22 from a tank 50 by means of a pump 52, driven by a pump motor PM, the electrolyte being pumped through a filter system 54, and a pressure regulating system of valves and the like 56 so that the static pressure measurable on gauge 60 and existing in the conduit at its exit and inlet to the manifold, and therefore the inlet to the electrode 22 and the work gap between the electrode working face and the workpiece, is maintained at at least 25 p.s.i., and preferably higher.

The electrolyte, which may be, as previously explained, a saline solution, is drained from the cavity being formed in the workpiece by gravity through a collection system 62 back to the tank 50 for recirculation by the pump 52.

As thus far described, the electrolytic machining apparatus of the present invention is like that which has been disclosed in the aforementioned Lynn A. Williams Patent No. 3,058,895, Leonard Malkowski Patent No. 3,031,140, and Lynn A. Williams and Leonard Malkowski patent application Ser. No. 201,679, now Patent No. 3,287,246.

The electrolytic machining apparatus theoretically will work under normal conditions and will provide for an infeed of the electrode 22 into the workpiece W at a rate which is desired and which is compatible with the electrolytic current which passes. Such current is obtainable from a power supply, indicated generally by the reference character 62, and which may be the ordinary commercial three-phase 440 volt line 64. The alternating current is rectified in a manner to be hereinafter explained and has a cathodic connection 66 to the mounting plate 26 for the manifold 24 and electrode 22 and has an anodic connection 68 to the vise 10, thereby making the workpiece W positive with respect to the negative electrode 22.

One phase of the three-phase power supply 64 is connected at 70 to the control circuit relays and switches 71 for operating the pump motor PM and the electrode infeed motor M, as well as other components of the circuit, as will be explained hereinafter, and for a regulating control 72 which is the heart of the present invention and which controls and regulates the voltage of the electrolyzing current.

The remaining control is diagramed in its two forms in FIGS. 2 and 3 of the drawings, and the control relays and associated switches, indicated at 71, are diagramed in FIG. 4. The power supply 64 is indicated in the upper portion of both FIGS. 2 and 3, and a portion thereof is shown in FIG. 4.

The current and voltage regulating system will first be described with respect to an initial concept of this invention as illustrated in FIG. 2, and applied to the schematic illustration of FIG. 1 and the wiring diagram of FIG. 4, and then with respect to an improved and preferred embodiment of the invention as shown in FIG. 3, with the understanding that the same component parts illustrated in FIG. 3 will be designated with the same reference characters as in FIG. 2, and will operate functionally in the same manner as they do functionally in the embodiment of the circuit of FIG. 2.

FIG. 2 is a wiring diagram for the regulating control for the three-phase power supply of the electrolytic machining apparatus of the type disclosed in the aforementioned patents and patent application. The power is taken from the conventional three-phase line 64 through a step-down delta transformer 69 and through a rectifying network whose output is connected by the conductor 68 to the workpiece W and by the conductor 66 to the electrode 22. The network includes in each of its legs a silicon controlled rectifier 78–1, 78–2, 78–3, and a silicon diode 80 in series, forming a three-phase full wave bridge. The regulating control includes a power supply 82, a spark director unit 84, and a circuit to supply a reference voltage.

The electrolyzing current supply conductors 66, 68 are bridged by parallel connected one ohm resistors 73 to provide a minimum load across the output conductors 66, 68 when the apparatus is not being used for electrolytic machining, and the voltmeter 75. The maximum amount of current passing through the resistors 73 is between 3% and 5% of that available for electrolysis and has no appreciable effect on the system. The resistors 73 provide a constant current path for the silicon controlled rectifiers which should be provided with at least a minimum current flow to insure that they remain conductive when fired. A shunt connected ammeter 77 measures the electrolyzing current. The reference voltage is taken between movable contact 86 of a potentiometer 88 and ground.

This reference voltage is measured against the voltage across the work gap wherein shielded conductor 90 is connected directly to the workpiece W and shielded conductor 92 is connected to the electrode 22, the shielding preventing the application of stray frequencies to these sensing conductors. The reference voltage will have a value slightly lower than the actual voltage which is measured across the work gap while the electrolytic machining apparatus is operating normally.

The regulating control includes a bank of three differential amplifiers 94–1, 94–2, and 94–3, corresponding respectively to the first, second, and third phases of the three-phase commercial supply 64 and which will control at proper intervals, respectively, the firing of silicon controlled rectifiers 78–1, 78–2, 78–3, in the output network.

The power supply 82 to the controller includes a conventional step-down transformer 96, the primary of which is connected at 72*a* to one phase of the three-phase supply and the secondary of which is connected to a full wave rectifier 98 and a filter circuit 100. A double Zener voltage regulator and divider 102 including Zeners 104 and 106 is connected across the output of the filter 100 and provides a voltage across the Zener 104 of 22 volts and across the Zener 106 of 6.2 volts, or a total voltage across the output of the voltage divider of 28.2 volts. It should be noted that the Zener 106 provides a negative voltage at the tap 108 and the output includes a pair of filter capacitors 110.

The positive voltage in the power supply is transmitted across a series connected transistor 112 which is provided with a biasing voltage divider 114 which holds the base voltage at one-half the collector voltage so that normally there is maximum conduction across the series connected transistor 112 to a relay coil 116.

The relay coil 116 is connected to operate normally closed switches 115 and 117 in the controller 71 to control the motor M for advancing and retracting the electrode 22, and the motor PM for the pump 52 for supplying the electrolyte. The coil 116 is connected in series with the potentiometer 88 and with a normally deenergized silicon controlled rectifier 118 which is arranged in parallel with the potentiometer 88. The coil 116 is connected in parallel or in bypass relationship with a diode 120 which acts as a surge suppressor to remove the voltage when the field of the coil 116 collapses and to prevent reenergization of the silicon controlled rectifier 118. When the system is functioning normally, the current flow through the coil 116 and potentiometer 88 will be insufficient to operate the relay and the switches 115 and 117 will remain closed.

Under normal conditions, the silicon controlled rectifier 118 will not be conducting, but under any abnormal condition when a spark is detected across the work gap between the electrode 22 and the workpiece W, the silicon controlled rectifier 118 will be made conductive to bypass the potentiometer 88, thereby reducing the voltage measured thereacross between the movable contact 86 and ground to a value close to zero, thus effectively removing the reference voltage from the control circuit. When this occurs no triggering signal is received by any of the silicon controlled rectifiers 78–1, 78–2, and 78–3, and no further electrolyzing current conduction is possible after completion of the portion of the conducting cycle. This will cause a surge of current through the relay coil 116 and the relay will operate to open the switches 115 and 117 to stop the pump motor PM and the electrode feed motor M.

The three differential amplifiers 94–1, 94–2, and 94–3 are identical, and therefore only one will be described, it being noted that the suffix numerals to the other two will identify them with respect to the supply phase.

The differential amplifier 94–1 is fed from the power supply by being connected across phase one of the three-phase power supply, and includes a conventional step-down transformer 122–1 and a full wave rectifier 124–1, the output of which is connected to a five kilohm resistor 126–1, and a conductor 128–1 leading the input of the differential amplifier 94–1. The other side of the rectifier 124–1 is connected to ground and a Zener 130–1 is connected between the output of the resistor 126–1 and ground. This Zener is used as a clipper to secure a wave form in the output of this rectifier complex which is very nearly like that of a square wave. The common full wave output across one leg of a three-phase power supply has a value of 125 volts RMS. With the Zener connected as shown, the current which is supplied through the conductor 128–1 has an absolute value of 27 volts and a wave form very nearly like that of a square wave.

The conductor 128–1 is connected to a resistor 132–1 connected in series with the collector of a silicon transistor 134–1, the emitter of which is connected to a one-kilohm resistor potentiometer 136–1. The base of the silicon transistor 134–1 is connected to a voltage divider comprising a one kilohm resistor 138–1 connected to the positive side of the signal received from the work gap and a 2.2 kilohm resistor 140–1 connected to ground.

The differential amplifier 94–1 also includes a silicon transistor 142–1, the emitter of which is connected to the potentiometer 136–1 and the collector of which is connected to a capacitor 144–1, which in turn is connected to the conductor 128–1. The base of the silicon transistor 142–1 is connected to a voltage divider consisting of resistors 146–1 and 148–1 having the same values respectively as the resistors 138–1 and 140–1, but being connected respectively to the movable contact 86 for the reference voltage potentiometer 88 and ground. Therefore, the reference voltage is applied to the base of the silion transistor 142–1, and a modified working gap voltage ; applied to the base of the silicon transistor 134–1.

The circuit constitutes a constant current charging cir- uit for the capacitor 144–1 which receives its charge t a rate based on the difference between the reference oltage and the voltage appearing across the work gap.

The silicon transistors 134–1 and 142–1 are connected ı parallel, and the total current available to be passed ) them is that which is permitted to be passed by the otentiometer 136–1. Therefore, if the silicon transistor 34–1 is conducting a higher percentage of current than should, the current through the silicon transistor 142–1 'ill be lower and the rate of charging the capacitor 144–1 'ill be slowed. This will occur when the work gap volt- ge is higher than desired. Should the voltage at the work ap be low, then the current across the silicon transistor 42–1, sensitive to the reference voltage, would be high, nd the charging rate of the capacitor 144–1 would be reater. There is therefore a constant monitoring and egulation of the work gap voltage to maintain it at a redetermined value.

When the charge on the capacitor 144–1 reaches a value ıdicated by the setting of the potentiometer 150–1 form- ıg a part of a voltage divider which includes series con- ected resistors 152–1 and 154–1, the capacitor will excite ıe trigger electrode of silicon controlled rectifier 156–1 onnected in series with primary 158–1 of a pulse trans- ɔrmer 160–1 and an isolating silicon diode 162–1, the ıtter keeping the silicon controlled rectifier 156–1 from onducting prematurely, and the silicon controlled rectifier 56–1 will fire.

Secondary 164–1 of the pulse transformer 158–1 is con- ected through leads 166–1 and 168–1 in the phase one age of the three-phase output so that the silicon con- olled rectifier 78–1 will be rendered conductive thereby ) transmit rectified current in that stage to the output onductors 68 and 66 connected to the workpiece W and ıe electrode 22, thereby providing for the flow of elec- olyzing current therebetween.

The silicon controlled reutifier 78–1 will hold in the on"position as long as the potential is applied in the roper direction, which is on the forward going half of ıe cycle at a value which is determined by the duration f the conduction of the silicon controlled rectifier 78–1 ı the particular portion of the forward going phase of s conductivity. The duration of the conduction deter- ıines what portion of the cycle is conducted, and there- ɔre the voltage of the electrolyzing current.

Essentially, therefore, what is transmitted under normal onditions to the output leads 66 and 68 is a series of losely spaced short duration pulses which have the effect f a DC voltage of a value never greater, but controllably ss, than that of the secondary of the power transformer 9 which is ordinarily set at 18 volts.

When the electrolyzing apparatus is operating normally, ıe silicon controlled rectifiers 78–1, 78–2, and 78–3 will e rendered conductive in order and for the desired eriods of time as dictated by the amount of time needed ) charge the capacitors 144–1, 144–2, and 144–3.

The shielded conductors 90 and 92, connected respec- vely to the workpiece W and the electrode 22 in the lectrolytic machining apparatus to sense the potential xisting therebetween and across the work gap, are con- ected to a low pass filter 170 comprising a 15 henry hoke 172 and a one microfarad capacitor 173. This filter 'ill pass all signals below about 225 cycles per second nd filters out everything thereabove and places sufficient esistance in the line to reduce somewhat the voltage 'hich is measured against the reference voltage.

The conductors 90, 92 are connected to a conventional igh pass filter 172, the input of which comprises a stepup ansformer 178 and a capacitor 176 for the purpose of ıatching the low impedance across the work gap to the igh impedance of a silicon transistor 180, the base of 'hich is connected to receive signals from the output 175 of the high pass filter 174. The filter 174 is so constructed that it passes any signal higher than about 2,500 cycles, and this signal is impressed across a resistor 182 at the filter output and forming part of the potentiometer, the movable contact of which is connected to base of the silicon transistor 180.

A voltmeter 183 is connected across the conductors 90 and 92 to provide a reading on the actual electronizing current voltage.

The collector of the silicon transistor 180 is connected through a small value capacitor 184 to a switch 186 which feeds in the position shown in the drawing to the spark detect unit 84 and particularly to the base of a silicon transistor 188 forming the first amplification portion of a monostable multivibrator generally indicated at 190. The capacitor 184 is of small value to provide signal differentiation or "spiking" properly to operate the multivibrator 190.

The collector of the silicon transistor 188 is connected to the base of silicon transistor 192 through a capacitor 194 which has a negative charge placed thereon by virtue of its connection to the B-terminal 108 through a resistor 196. Therefore, as the silicon transistor 188 conducts, the capacitor is discharged, rendering the silicon transistor 192 conductive so that through feedback conductor 198 and capacitor 200 it reignites or reestablishes the conductivity of the silicon transistor 188, thus maintaining a conductivity period therethrough which is of sufficient duration to excite the trigger electrode of silicon controlled rectifier 118 in the manner to be described immediately. A steering diode 189 is connected to the emitter of the transistor 188 to insure that the multivibrator responds only to a positive pulse.

The collector for the silicon transistor 192 is connected through coupling capacitor 201 to the base of an amplifying silicon transistor 202. The silicon transistor 202 is isolated from the multivibrator 190 by a voltage divider 203. When it is excited by a square wave signal from the multivibrator, a pulse of current flows through primary 204 of a pulse transformer 206 to ground. The secondary 208 of the pulse transformer 206 is connected to the trigger electrode of the silicon controlled rectifier 118. The characteristics of this pulse transformer are such that when a flow of current therethrough is established by pulsing the silicon transistor 202, a pulse of about 5 milliseconds duration is applied to the trigger electrode of the silicon controlled rectifier 118, thereby causing the latter to conduct.

When the silicon controlled rectifier 118 conducts, it effectively bypasses the potentiometer 88, thereby reducing the reference voltage to a value close to zero, thereby lengthening, preferably less than, 25 v. and usually in the range of .05 v. to .15 v., the charge time on the capacitor 144–1 (or whichever is in sequence to be charged) to such an extent that it cannot be charged high enough to fire the silicon controlled rectifier 156–1 within the half cycle period when the silicon controlled rectifier 78–1 may become conductive. Thus, the electrolyzing current is immediately shut off since none of the capacitors 144–1, 144–2, and 144–3, will be adequately charged. This system is highly sensitive and will respond to a single spark in the work gap and a single pulse through the high pass filter 174. By using the full wave rectifiers 124–1, 124–2, and 124–3, complete discharge of the capacitors 144–1, 144–2, and 144–3 every half cycle is assured, and no delayed charge on these capacitors is possible which might otherwise provide a false signal to fire the silicon controlled rectifiers 156–1, 156–2, and 156–3.

When the silicon controlled rectifier 118 conducts a surge of current flows through the relay coil 116 and the relay is operated to open the normally closed switches 115 and 117 in the circuit of the machine control relays.

The spark detect unit 84 is protected by a time delay relay 210 which includes a pair of contacts 212 across the emitter of the silicon transistor 202 and a heater 214, the latter being connected across one phase of the power supply 64. The contacts 212 are normally open, and when the power supply is energized the heater 214 is turned on and the contacts 212 close after a period of about five seconds. This insures that the spark detect unit 84 will not respond to closing of switches and the energization of the various relays forming a part of the power system of the electrolytic machining apparatus which could give a false signal and cause premature shutoff.

The contacts 212 are connected respectively to the output of the emitters of the silicon transistors 188, 192, and 202 and to a conductor 216 leading to the output of the power supply unit 82. The contacts 212 are also protected by a filter capacitor 218 to protect them in the event of chattering or bouncing during closure.

The switch 186 is also movable to connect the collector of the silicon transistor 180 to a spark suppress unit 220 which is not significant to the present invention and therefore will not be further described or referred to.

The switches 115 and 117 are a pair of the unit 71 which is schematically illustrated in FIG. 4. The unit receives its power from one phase of the three-phase supply 64 through a transformer 222, the secondary of which is connected to the lines 224 and 226. The unit is started by first closing a master gang switch 228 in the three-phase supply, which will immediately energize or turn on a light 230 to indicate the system is in condition for operation. A manually operated warmup switch 232 is closed which energizes a warmup relay 232–R which closes a holding switch 232–RS. This energizes a timer 234 which closes a switch 234–S in the circuit to a power ready light 236 after an appropriate interval of time has passed to allow the various circuit components to warm up. It has, however, been found that with the use of the transistors and silicon controlled rectifiers in the controller 72, substantially no warmup time is required and therefore the timer may be set to respond in a minimum amount of time, as for example, one-half second. The warmup circuit also includes a manually controlled "off" switch 238 which may be opened to break the circuit, deenergizing the relay 232–R, timer 234, which will then open the switch 234–S.

Next, the pump motor PM is started and this is done by closing switch 240 in the line to the pump motor relay 240–R, which closes a switch 240–RS in a holding circuit to the relay and a plurality of switches 240–RPM in the three-phase supply to the pump motor. The pump motor relay 240–R is connected in series with a manually controlled "off" switch 242 and the normally closed switch 115 which is operated by the relay coil 116 in the event of a malfunctioning of the system, as previously described.

The machining power indicated is ready to be turned on when the timer switch 234–S is closed through the normally closed switch 117 and the indicator light 236. This line also includes a pair of switches 244 which are operated by circuit breakers 244–C at the input to the transformer 69, thereby breaking the circuit should there be a failure in the power supply to the rectifier for the electrolyzing current.

The machining power is turned on by closing a switch 246 to the machining power relay 246–R, which when energized closes a switch 246–RS1 in a holding circuit, and a switch 246–RS2 to a blower 248, which cool the transistors and silicon controlled rectifiers in the controller 72. A manually operated "off" switch 250 is also provided in this circuit. This circuit is in series with the switch 117 which is normally closed and which is opened when the relay 116 is operated as a result of malfunctioning of the system as previously described, and which will have the effect of deenergizing the machining relay and other elements in series with the switch 117.

A fan switch 252 in series with the timer switch 234–S, circuit breaker switches 244, malfunction responsive switch 117, and machining power switches 250 and 246, is closed to make the final conditioning of the circuit. This fan switch also, when closed, turns on the scavenging fan in the work area. When it is closed, a light 254 is energized to indicate that the machining power is on and the apparatus is ready for operation. A line contactor relay 256–R is also energized, and this closes a series of line contactor switches 256–RS in the three-phase supply to the controller 72 and the transformer 69 and silicon controlled rectifier output therefrom.

The last switch to be closed is manually operated switch 258 in the circuit to the drive motor relay 258–R which, when closed, closes switch 258–RS1 in its holding circuit and the switches 258–RS2 in the three-phase feed to the drive motor M. A manually operated "off" switch 260 is in series with the drive motor relay 258–R and therefore the infeed of the electrode 22 can be stopped at any time. A signal light 262 parallel with the relay 258–R indicates when the drive motor is operating.

It should also be noted that the motor M is provided with conventional reversing switches 264 so that the motor can be reversed for withdrawal or retraction of the electrode. These switches may be operated manually, and additionally they may be set to be operated automatically when the desired depth of electrolyzing cut has been reached.

The switches 115 and 117 are so located in the circuit 71 that if at any time the apparatus malfunctions, due to a spark across the work gap, these switches will be opened immediately, thereby cutting off the power to the pump motor relay 240–R, to the machining relay 246–R, the line contactor relay 256–R, and the electrode infeed motor relay 258–R to stop the apparatus and permit the condition which caused the malfunction to be corrected. The line contactor relay 256–R when deenerized will open switches 256–RS, thereby cutting off the electrolyzing current immediately.

It is clear, therefore, that this system functions in the smallest possible fraction of a second in response to a single spark in the work gap, to shut down the apparatus and prevent any damage to the workpiece W or the electrode 22.

In FIG. 3 there is diagrammatically illustrated another form of regulating controller 72 which is identical with that shown in FIG. 2, except that it omits the spark suppression unit 220 and relocates the time delay relay 210.

Inasmuch as the spark suppression unit 220 is omitted from its FIG. 2 position, the series connected transistor 112 is no longer necessary, and the output from the voltage divider 102 and its associated filtering capacitors 110 are connected directly to the relay coil 116. In all other respects this portion of the circuit is identical with that previously described.

The current for the spark detection unit 82 is now supplied directly from the output of the voltage divider on a positive pole thereof through conductor 270.

The now normally closed time delay relay 210 is connected so that its heater 214 is connected in series with the primary of the transformer 96, and one of the movable contacts 212 is connected in the line 272 which connects the tap 175 from the output of the high pass filter to the base of the transistor 180. The other tap of the time delay relay is connected to ground.

In operation the circuit of FIG. 3 responds precisely as that of FIG. 2, considering that the spark suppression unit is bypassed, and therefore the same reference characters have been used throughout.

It will be seen from the foregoing description that the objects which have been set forth in the opening portion of this description are fully attained by the disclosed apparatus.

While preferred embodiments of the control system constituting this invention have been shown and described, it will be apparent that numerous modifications and variations thereof may be made therein without departing from the underlying principles of the invention. It is thereore desired, by the following claims, to include within the scope of the invention all such variations and modifications by which substantially the results of this invention may be obtained through the use of substantially the same or equivalent means.

What is claimed as new and desired to be secured by United States Letters Patent is:

1. In an electrolytic machining apparatus having means for holding a workpiece, an electrode, power means for moving the electrode and the workpiece holding means relatively toward each other, and pump means for pumping an electrolyte into and through the work gap between the electrode and the workpiece, the combination comprising, electric circuit means controlling the operation of the power means and the pump means; a step-down transformer adapted to be connected to a source of alternating current; a current rectifying output stage coupled to the transformer and adapted to be connected to the electrode and the workpiece in a sense to make the workpiece anodic, said output stage including at least one silicon controlled rectifier; a voltage control unit coupled to said silicon controlled rectifier to fire it on the forward half cycle of its conductivity at a voltage greater than zero and not greater than the maximum voltage for the conductive half cycle of said rectifier, means providing a reference voltage, means connected to measure the voltage between the workpiece and the electrode, and means sensitive to matching the value of the voltage between the workpiece and the electrode with the reference voltage to time the firing of said silicon controlled rectifier to maintain the voltage between the workpiece and the electrode at a predetermined value; and means connected for detecting an instantaneous change in the voltage between the workpiece and the electrode and connected to interrupt the firing of said silicon controlled rectifier in said output stage and to cause said electric circuit means to deenergize the power means and the pump means upon such detection, said last named means comprising a normally deenergized means connected in parallel with said reference voltage providing means and a normally deenergized means connected to act upon said electric circuit means, whereby both said normally deenergized means are energized upon the detection of an instantaneous change in the voltage between the workpiece and the electrode to reduce the reference voltage to a value such that said means sensitive to matching the value of the voltage between the workpiece and the electrode with the reference voltage will not fire said silicon controlled rectifier and to deenergize the power means and the pump means.

2. In an electrolytic machining apparatus having means for holding a workpiece, an electrode, power means for moving the electrode and the workpiece holding means relatively toward each other, and pump means for pumping an electrolyte into and through the work gap between the electrode and the workpiece, the combination comprising, electric circuit means controlling the operation of the power means and the pump means, and normally closed switch means in said circuit means; a step-down transformer adapted to be connected to a source of multiphase alternating current; a current rectifying output stage coupled to the transformer and adapted to be connected to the electrode and the workpiece in a sense to make the workpiece anodic, said output stage including a bank of parallel connected, successively fired silicon controlled rectifiers with each rectifier connected to conduct one phase of the current source; a voltage control unit coupled to said silicon controlled rectifiers to fire them successively on the forward half cycle of their conductivity at a voltage greater than zero and not greater than the maximum voltage for the conductive half cycle of said rectifiers, means providing a reference voltage, means connected to measure the voltage between the workpiece and the electrode, and means for each silicon controlled rectifier in said output stage sensitive to matching the value of the voltage between the workpiece and the electrode with the reference voltage to time the firing of said rectifiers to maintain the voltage between the workpiece and the electrode at a predetermined value; and means connected for detecting a spark between the workpiece and the electrode and connected to interrupt the firing of said silicon controlled rectifiers in said output stage and to open said electric circuit means for the power means and the pump means upon such spark detection, said last named means comprising a normally deenergized means connected in parallel with said reference voltage providing means and a solenoid coil means connected to open said switch means and connected in series with said normally deenergized means, and means actuated by a spark signal coupled to energize said normally deenergized means and said solenoid coil means, whereby the reference voltage is reduced to a value such that said means sensitive to matching the value of the voltage between the workpiece and the electrode with the reference voltage will not fire said silicon controlled rectifiers and said switch means is opened to deenergize the power means and the pump means.

3. In an electrolytic machining apparatus having means for holding a workpiece, an electrode, powder means for moving the electrode and the workpiece holding means relatively toward each other, and pump means for pumping an electrolyte into and through the work gap between the electrode and the workpiece, the combination comprising, a first relay controlling the operation of the power means, a second relay controlling the operation of the pump means, and a normally closed switch in the circuit to each of said relays; a step-down transformer adapted to be connected to a source of multiphase alternating current; a current rectifying output stage coupled to the transformer and adapted to be connected to the electrode and the workpiece in a sense to make the workpiece anodic, said output stage including a bank of parallel connected, successively fired silicon controlled rectifiers with each rectifier connected to conduct one phase of the current source; a voltage control unit coupled to said silicon controlled rectifiers to fire them successively on the forward half cycle of their conductivity at a voltage greater than zero and not greater than the maximum voltage for the conductive half cycle of said rectifier, means providing a reference voltage, means connected to measure the voltage between the workpiece and the electrode, and a differential amplifier for each silicon controlled rectifier in said output stage, the output of which is connected to the base of its respective rectifier, and the timing of the output signal being controlled by matching the value of the voltage between the workpiece and the electrode with the reference voltage to maintain the voltage between the workpiece and the electrode at a predetermined value; and means connected for detecting a spark between the workpiece and the electrode and connected to interrupt the firing of said silicon controlled rectifiers in said output stage and to open said switches to said power means and said pump means relays upon such spark detection, said last named means comprising a normally nonconducting silicon controlled rectifier connected in parallel with said reference voltage providing means and a solenoid coil means connected to open said switches and connected in series with said last named silicon controlled rectifier, a monostable multivibrator connected when energized to trigger a pulse transformer the secondary of which is connected to the base of said last named silicon controlled rectifier, and means including a high pass filter connected between the input to said multivibrator and the workpiece and the electrode so that a single spark renders the multivibrator conductive to energize said last named silicon controlled rectifier whereby the reference voltage is reduced to a value such that said differential amplifiers will not fire said silicon controlled rectifiers and said solenoid is energized to open said switches to the power means and the pump means relays.

4. A power supply for supplying a low voltage direct current between an electrode and a workpiece in an electrolytic machining apparatus wherein the workpiece is maintained anodic with respect to the electrode, comprising in combination, a step-down transformer adapted to be connected to a source of alternating current, a rectifying output stage coupled to the transformer and adapted to be connected to the electrode and the workpiece in a sense to make the workpiece anodic, the output stage including at least one silicon controlled rectifier, a voltage control unit coupled to said rectifier to fire it on the forward half cycle of its conductivity at a voltage greater than zero and not greater than the maximum voltage for the conductive half cycle of the rectifier, means connected for detecting a sudden momentary change in the voltage existing across the space between the electrode and the workpiece, and means coupled to said detecting means and to said silicon controlled rectifier to interrupt its firing upon the detection of a sudden momentary change in the voltage between the electrode and the workpiece.

5. A power supply for supplying a low voltage direct current between an electrode and a workpiece in an electrolytic machining apparatus wherein the workpiece is maintained anodic with respect to the electrode, comprising in combination, a stepdown transformer adapted to be connected to a source of multiphase alternating current, an output stage coupled to the transformer and adapted to be connected to the electrode and the workpiece, the output stage including a bank of parallel connected, successively fired silicon controlled rectifiers with each rectifier corresponding to one phase of the current source, a voltage control unit coupled to said rectifiers to fire them successively on the forward half cycle of their conductivity at a voltage greater than zero and not greater than the maximum voltage for the conductive half cycle of the rectifiers, means connected for detecting a sudden momentary change in the voltage existing across the space between the electrode and the workpiece, and means coupled to said detecting means and to said bank of silicon controlled rectifiers to interrupt their firing upon the detection of a sudden momentary change in the voltage between the electrode and the workpiece.

6. A power supply for supplying a low voltage direct current between an electrode and a workpiece in an electrolytic machining apparatus wherein the workpiece is maintained anodic with respect to the electrode, comprising in combination, a step-down transformer adapted to be connected to a source of multiphase alternating current, an output stage coupled to the transformer and adapted to be connected to the electrode and the workpiece in a sense to make the workpiece anodic, the output stage including a bank of parallel connected, successively fired silicon controlled rectifiers with each rectifier corresponding to one phase of the current source, a voltage control unit coupled to said rectifiers to fire them successively on the forward half cycle of their conductivity at a voltage greater than zero and not greater than the maximum voltage for the conductive half cycle of the rectifiers and at such time as to maintain said voltage at a predetermined value, means connected for detecting a spark across the space between the electrode and the workpiece, and means coupled to said detecting means and to said bank of silicon controlled rectifiers to interrupt their firing upon the detection of a spark between the electrode and the workpiece.

7. A power supply for supplying a regulated, low voltage direct current between an electrode and a workpiece in an electrolytic machining apparatus wherein the workpiece is maintained anodic with respect to the electrode, comprising in combination, a step-down transformer adapted to be connected to a source of alternating current; an output stage coupled to the transformer and adapted to be connected to the electrode and the workpiece, the output stage including at least one silicon controlled rectifier; a voltage control unit coupled to said silicon controlled rectifier to fire it on the forward half cycle of its conductivity at a voltage greater than zero and no greater than the maximum voltage for the conductive half cycle of the rectifier, means providing a reference voltage, means connected to measure the voltage between the workpiece and the electrode, and means sensitive to matching the value of the voltage between the workpiece and the electrode with the reference voltage to maintain the voltage between the workpiece and the electrode at a predetermined value; and means connected for detecting a sudden momentary change in the voltage between the workpiece and the electrode and connected to interrupt the firing of said silicon controlled rectifier in said output stage upon such detection.

8. A power supply for supplying a regulated, low voltage direct current between an electrode and a workpiece in an electrolytic machining apparatus wherein the workpiece is maintained anodic with respect to the electrode, comprising in combination, a step-down transformer adapted to be connected to a source of alternating current; an output stage coupled to the transformer and adapted to be connected to the electrode and the workpiece, the output stage including at least one silicon controlled rectifier; a voltage control unit coupled to said silicon controlled rectifier to fire it on the forward half cycle of its conductivity at a voltage greater than zero and not greater than the maximum voltage for the conductive half cycle of the rectifier including means providing a reference voltage, means connected to measure the voltage between the workpiece and the electrode, and means sensitive to matching the value of the voltage between the workpiece and the electrode with the reference voltage to control the firing of said silicon controlled rectifier to maintain the voltage between the workpiece and the electrode at a predetermined value; and means connected for detecting a spark between the workpiece and the electrode and connected to interrupt the firing of said silicon controlled rectifier in said output stage upon such spark detection, said last named means comprising a normally non-conducting silicon controlled rectifier connected in parallel with said reference voltage providing means, and a circuit actuated by a spark between the workpiece and the electrode and connected to fire said last named silicon controlled rectifier thereby reducing the reference voltage to a value such that said means sensitive to matching the value of the voltage between the workpiece and the electrode with the reference voltage will not fire said silicon controlled rectifier.

9. A power supply for supplying a regulated, low voltage direct current between an electrode and a workpiece in an electrolytic machining apparatus wherein the workpiece is maintained anodic with respect to the electrode, comprising in combination, a step-down transformer adapted to be connected to a source of multiphase alternating current; an output stage coupled to the transformer and adapted to be connected to the electrode and the workpiece, the output stage including a bank of parallel connected, successively fired silicon controlled rectifiers with each rectifier connected to conduct one phase of the current source; a voltage control unit coupled to said silicon controlled rectifiers to fire them successively on the forward half cycle of their conductivity at a voltage greater than zero and not greater than the maximum voltage for the conductive half cycle of the rectifiers including means providing a reference voltage, means connected to measure the voltage between the workpiece and the electrode, and means sensitive to matching the value of the voltage between the workpiece and the electrode with the reference voltage to control the firing of said silicon controlled rectifiers to maintain the voltage between the workpiece and the electrode at a predetermined value; and means connected for detecting a spark between the workpiece and the electrode and connected to interrupt the firing of said silicon controlled rectifiers in said output stage upon such spark detection, said last named means comprising a normally nonconducting silicon controlled rectifier connected in parallel with said reference voltage providing means, a monostable multivibrator connected when energized to fire said last named silicon controlled rectifier, and means including a high pass filter connected between the input to said multivibrator and the workpiece and the electrode so that a single spark energizes said multivibrator to fire said last named silicon controlled rectifier thereby reducing the reference voltage to a value such that said means sensitive to matching the value of the voltage between the workpiece and the electrode with the reference voltage will not fire said silicon controlled rectifier.

10. A power supply for supplying a regulated, low voltage direct current between an electrode and a workpiece in an electrolytic machining apparatus wherein the workpiece is maintained anodic with respect to the electrode, comprising in combination, a step-down transformer adapted to be connected to a source of multiphase alternating current; an output stage coupled to the transformer and adapted to be connected to the electrode and the workpiece, the output stage including a bank of parallel connected, successively fired silicon controlled rectifiers with each rectifier connected to conduct one phase of the current source, a voltage control unit coupled to said silicon controlled rectifiers to fire them successively on the forward half cycle of their conductivity at a voltage greater than zero and not greater than the maximum voltage for the conductive half cycle of the rectifiers including means providing a reference voltage, means connected to measure the voltage between the workpiece and the electrode, and a differential amplifier for each silicon controlled rectifier in said output stage, the output of which is connected to the base of its respective rectifier to provide a signal for the firing thereof, and the timing of the output signal being controlled by matching the value of the voltage between the workpiece and the electrode with the reference voltage to maintain the voltage between the workpiece and the electrode at a predetermined value; and means connected for detecting a spark between the workpiece and the electrode and connected to interrupt the firing of said silicon controlled rectifiers in said output stage upon such spark detection, said last named means comprising a normally nonconducting silicon controlled rectifier connected in parallel with said reference voltage providing means, a monostable multivibrator connected when energized to trigger a pulse transformer the secondary of which is connected to the base of said last named silicon controlled rectifier, and means including a high pass filter connected between the input to said multivibrator and the workpiece and the electrode so that a single spark renders the multivibrator conductive to fire said last named silicon controlled rectifier thereby reducing the reference voltage to a value such that said differential amplifier will not fire said silicon controlled rectifiers in said output stage.

*11. A power supply for suplying a low voltage direct current between an electrode and a workpiece in an electrolytic machining apparatus wherein the workpiece is maintained anodic with respect to the electrode, comprising in combination, a circuit adapted to be connected at its input to a source of alternating current and adapted to have its output coupled to the electrode and the workpiece in a sense to make the workpiece anodic, a step-down transformer in said circuit, at least one silicon controlled rectifier in said circuit, a current rectifying output stage coupled to said transformer in said transformer circuit ahead of the electrode and the workpiece, a voltage control unit coupled to said silicon controlled rectifier to fire it on the forward half cycle of its conductivity at a voltage greater than zero and less than the maximum voltage for the conductive half cycle of the silicon controlled rectifier, means connected for detecting a sudden momentary change in the voltage existing across the space between the electrode and the workpiece, and means coupled to said detecting means and to said silicon controlled rectifier to effect its firing upon the detection of a sudden momentary change in the voltage between the electrode and the workpiece.*

*12. A power supply claimed in claim 11 wherein the effecting of said firing interrupts said low voltage direct current supply between the electrode and the workpiece.*

References Cited

The following references, cited by the Examiner, are of record in the patented file of this patent or the original patent.

UNITED STATES PATENTS

| | | | |
|---|---|---|---|
| 3,230,440 | 1/1966 | Kleiner | 321—11 |
| 3,328,279 | 6/1967 | Williams et al. | 204—228 |
| 3,332,863 | 7/1967 | Woods | 204—143 R |
| 3,339,107 | 8/1967 | Aldenhoff | 219—131 R |

OTHER REFERENCES

Berman, Brauch: "Controlled Rectifier Power Supply is Short Circuit Protected," Nov. 11, 1959, Electronic Design, p. 168.

JOHN H. MACK, Primary Examiner

D. R. VALENTINE, Assistant Examiner

U.S. Cl. X.R.

204—228, 143 R; 219—69; 315—227; 321—11